T. P. DAVIDSON & A. PARVIS.
Hay-Loaders.
No. 137,751. Patented April 8, 1873.
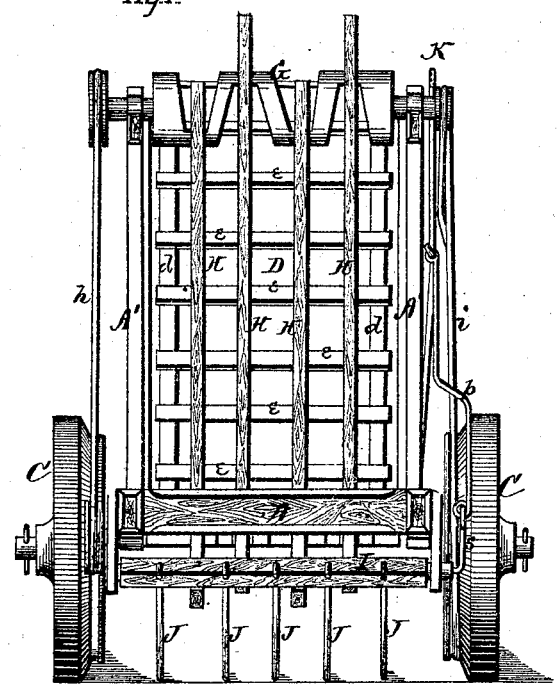
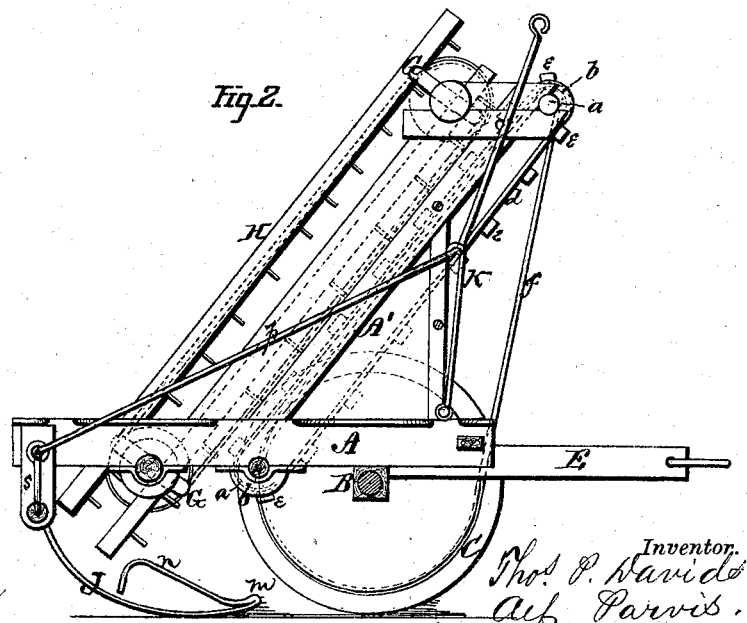

UNITED STATES PATENT OFFICE.

THOMAS P. DAVIDSON AND ALF PARVIS, OF LIBERTY, INDIANA.

IMPROVEMENT IN HAY-LOADERS.

Specification forming part of Letters Patent No. 137,751, dated April 8, 1873; application filed February 5, 1873.

*To all whom it may concern:*

Be it known that we, THOMAS P. DAVIDSON, and ALF PARVIS, of Liberty, in the county of Union and in the State of Indiana, have invented certain new and useful Improvements in Hay-Rakes; and do hereby declare that the following is a full, clear, and exact description thereof, reference being had to the accompanying drawing and to the letters of reference marked thereon, making a part of this specification.

The nature of our invention consists in the construction and arrangement of a combined hay rake and loader, as will be hereinafter more fully set forth.

In order to enable others skilled in the art to which our invention appertains to make and use the same, we will now proceed to describe its construction and operation, referring to the annexed drawing, in which—

Figure 1 is a rear elevation, and Fig. 2 a side elevation, of our combined hay rake and loader.

A represents the main frame, at a suitable distance from the front of which is the axle B having a driving-wheel, C, on each end. E is the tongue attached to the frame and axle to be connected with the rear end of a wagon. On the main frame A is erected a frame, A', which is inclined forward, as shown in Fig. 2. In this inclined frame is an inclined board or back, D, at each end of which is a shaft or roller, a, having a flanged pulley, b, at or near each end. Over these pulleys pass endless belts d d, which are connected by slats e e, and when in operation thus form the carrier for conveying the hay from the rake and depositing it in the wagon-box, the upper shaft or roller a being situated above the rear end of the wagon-box when the machine is attached to the wagon. This carrier is operated by a band or belt, f, passing a pulley formed on or attached to the side of one of the driving-wheels and another pulley on the end of the upper shaft or roller a. In the main frame A, in front of the inclined frame A', is located a crank-shaft, G, and a similar shaft is located in the upper end of the frame A'. On the cranks of the two shafts G G are placed rakes H H, which, as the shafts revolve, hold the hay on the carrier d e, and assist in carrying it up to be deposited in the wagon-box. Pulleys on the ends of the shafts G G are connected by a belt or band, h, and on the opposite end of the upper crank-shaft is another pulley connected by a belt or band, i, with a pulley on the other driving-wheel C, and thus motion is communicated to the rakes H H. Under the rear end of the main frame A in suitable boxes is hung the rake-head I, to which the teeth J J are attached. These teeth are each made of a single piece of wire, one end of which is fastened to the head I, and then curved downward and forward, as shown in Fig. 2. The wire is then bent over backward, forming the point m of double wire, and the wire then curved upward, forming the raise n, and the extreme end of the wire bent downward.

The hay, being caught by the points m m of the teeth slides up on the inclines n n so as to be caught by the rakes H H, and then by the combined action of said rakes and the carrier d e the hay is elevated and deposited in the wagon-box. The rake-teeth J are raised up from the ground by means of a lever, K, connected by a rod, p, with a crank, s, attached to one of the journals of the rake-head I.

Having thus fully described our invention, what we claim as new, and desire to secure by Letters Patent, is—

The combination of the endless carrier d e and the rakes H H connected to and operated by the crank-shafts G G, substantially as set forth.

In testimony that we claim the foregoing we have hereunto set our hands this 3d day of January, 1873.

THOMAS P. DAVIDSON.
ALF PARVIS.

Witnesses:
RILEY YORK,
WILLIAM RUSSELL.